(12) United States Patent  (10) Patent No.: US 6,956,817 B1
Kurosawa  (45) Date of Patent: Oct. 18, 2005

(54) COMMUNICATION SYSTEM

(75) Inventor: Takuji Kurosawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/568,002

(22) Filed: May 10, 2000

(30) Foreign Application Priority Data

May 13, 1999 (JP) .................... 11-133178

(51) Int. Cl.[7] .............................. H04J 1/16; H04J 3/14
(52) U.S. Cl. ...................................... 370/227; 370/228
(58) Field of Search ............................... 370/225, 227, 370/228, 521, 422, 477, 216, 241, 242, 250, 370/244, 248; 379/16, 17

(56) References Cited

U.S. PATENT DOCUMENTS

| | | | | |
|---|---|---|---|---|
| 4,005,274 A | * | 1/1977 | Vagliani et al. ............. | 704/212 |
| 5,091,902 A | * | 2/1992 | Chopping et al. .......... | 370/223 |
| RE35,740 E | * | 3/1998 | Piasecki et al. ............. | 81/174 |
| 5,777,761 A | * | 7/1998 | Fee ............................ | 398/7 |
| 5,818,816 A | * | 10/1998 | Chikazawa et al. ........ | 370/225 |
| 5,818,843 A | * | 10/1998 | Virdee et al. .............. | 370/435 |
| 5,857,009 A | * | 1/1999 | Handig ...................... | 379/32.01 |
| 6,163,527 A | * | 12/2000 | Ester et al. ................ | 370/228 |
| 6,256,291 B1 | * | 7/2001 | Araki ......................... | 370/216 |
| 6,320,876 B1 | * | 11/2001 | Virdee et al. .............. | 370/468 |
| 6,393,002 B1 | * | 5/2002 | Paneth et al. .............. | 370/330 |

FOREIGN PATENT DOCUMENTS

| | | |
|---|---|---|
| JP | H6-338868 | 12/1994 |
| JP | H8-223165 | 8/1996 |
| JP | H11-68714 | 3/1999 |
| JP | 2000-49731 | 2/2000 |
| JP | 2000-269863 | 9/2000 |

* cited by examiner

*Primary Examiner*—Ajit Patel
(74) *Attorney, Agent, or Firm*—Scully, Scott, Murphy & Presser

(57) ABSTRACT

There is disclosed a communication system in which a line switch signal is sent to a remote station side from a local station side to switch a line without deteriorating the transmission efficiency. A CC message encoder allots the unused bit of CC message to a line switch signal for requesting line switch to a line switch circuit. DCME inserts CC message into a predetermined position in a DCME frame during a multiplex processing. DCME extracts CC message from the received DCME frame. A CC message decoder extracts the line switch signal included in the CC message. The line switch circuit connects one of a plurality of lines in response to the line switch signal.

12 Claims, 4 Drawing Sheets

COMMUNICATION SYSTEM

BACKGROUND OF THE INVENTION

1. Field of the Invention

The present invention relates to a communication system, particularly to a communication system in which a line between exchange stations is duplicated of a cable line and a radio line.

2. Description of the Related Art

There has heretofore been a communication system in which a telephone line between exchange stations is duplicated of a working cable line and a protection radio line (satellite line) for countermeasures against natural calamities, and the like. Since the satellite line can be used in a limited radio frequency, the number of lines cannot be increased. Therefore, by providing a radio line side with digital circuit multiplication equipment (DCME) defined by ITU-T G. 763, and sending a compressed signal, it is possible to effectively utilize resources of the limited radio frequency.

However, since the communication system in which the line is doubled is not considered in the ITU-T G. 763, a method of transmitting a line switch signal to realize line switch is not defined.

Therefore, in the communication system in which the telephone line between the exchange stations is duplicated of the cable line and radio line, when the DCME is disposed on the radio line side, a transmit-side line and a receiver-side line need to be individually switched.

FIG. 4 is a block diagram showing the constitution of the conventional communication system. Lines 32a connected to an exchanger (exchange station) 31a transmit 2048 kbit/s signals defined by ITU-T G. 732. These lines 32a are connected to a line switch circuit 33a. The line switch circuit 33a connects the line 32a to either line 34a or 35a in accordance with the control of a controller 40.

A multiplexer 36a multiplexes the signals transmitted by the lines 34a. Moreover, upon receiving the multiplexed signal from a cable line 37, the multiplexer 36a demultiplexes this signal into four 2048 kbit/s signals, and outputs these signals to the lines 34a. The multiplexer 36b demultiplexes the multiplexed 8192 kbit/s signal transmitted by the cable line 37 into four 2048 kbit/s signals, and outputs these signals to the lines 34b. The multiplexer 36b multiplexes the 2048 kbit/s signals inputted from the lines 34b to provide a 8192 kbit/s signal, and transmits this multiplexed signal to the cable line 37.

On the other hand, DCME 38a multiplexes the 2048 kbit/s signals transmitted by the lines 35a, and transmits the multiplexed signal to a radio line (satellite line) 39. Moreover, upon receiving the multiplexed signal from the radio line 39, the DCME 38a demultiplexes this signal into four 2048 kbit/s signals, and outputs these signals to the lines 35a. DCME 38b demultiplexes the multiplexed signal transmitted by the radio line 39 into four 2048 kbit/s signals, and outputs these signals to lines 35b. Moreover, the DCME 38b multiplexes the 2048 kbit/s signals inputted from the lines 35b, and transmits the multiplexed signal to the radio line 39. A line switch circuit 33b connects either line 34b or 35b to a line 32b in accordance with the line switch signal outputted from an extractor 42b described later. The lines 32b are connected to an exchanger (exchange station) 31b.

In the above-described communication system, the controller 40 outputs a line switch signal to an inserter 42a. The inserter 42a inserts the line switch signal into the channel of the line 35a for transmitting a data signal or a phone signal. Moreover, the extractor 42b extracts the line switch signal transmitted from the remote station side from the line 35b. The line switch circuit 33a can be operated in cooperation with the line switch circuit 33b in this manner.

In the above-described conventional communication system, since the channel for transmitting the data signal or the phone signal is used to transmit the line switch signal, and the local station side line switch circuit is operated in cooperation with the remote station side line switch circuit, there is a problem that the transmission efficiency is deteriorated.

SUMMARY OF THE INVENTION

The present invention has been developed to solve the above-described problem, and an object thereof is to provide a communication system which can switch a line by sending a line switch signal to a remote station side from a local station side without deteriorating the transmission efficiency.

According to the present invention, there is provided a communication system in which a line between exchange stations is duplicated of a cable line and a radio line, DCME defined by ITU-T G. 763 is disposed on the side of the radio line, and a line switch circuit for switching the cable line and the radio line is added between the exchange station and the DCME. Moreover, the system includes: setting means, disposed on the side of a local station, for allotting a control channel unused bit in a DCME frame transmitted from the DCME of the local station side to a line switch signal for requesting a line switch to the line switch circuit on the side of a remote station; and extracting means, disposed on the remote station side, for extracting the line switch signal from the control channel unused bit in the DCME frame received by the DCME of the remote station side, and outputting the line switch signal to the line switch circuit of the remote station side.

Moreover, one constitution example of the above-described communication system is provided with control means, disposed on the local station side, for controlling the line switch circuit of the local station side, and outputting the line switch signal to the setting means after the line switch of the local station side is completed, so that the other station side line switch is performed after the local station side line switch is performed.

Furthermore, as one constitution example of the above-described communication system, the control means connects both the cable line and the radio line via the DCME to the exchange station of the local station side for a definite time immediately before the line switch circuit of the local station side is controlled to perform the line switch.

Additionally, one constitution example of the above-described communication system further includes: setting means, disposed on the remote station side, for allotting the control channel unused bit in the DCME frame transmitted from the DCME of the remote station side to a line switch end signal indicating the utilized line of the remote station side; and extracting means, disposed on the local station side, for extracting the line switch end signal from the control channel unused bit in the DCME frame received by the DCME of the local station side, and outputting the line switch end signal to the control means, and the control means returns the utilized line of the local station side to a line before the switch, when the remote station side utilized line indicated by the line switch end signal disagrees with the local station side utilized line.

DETAILED DESCRIPTION OF THE PREFERRED EMBODIMENTS

Figure 1:
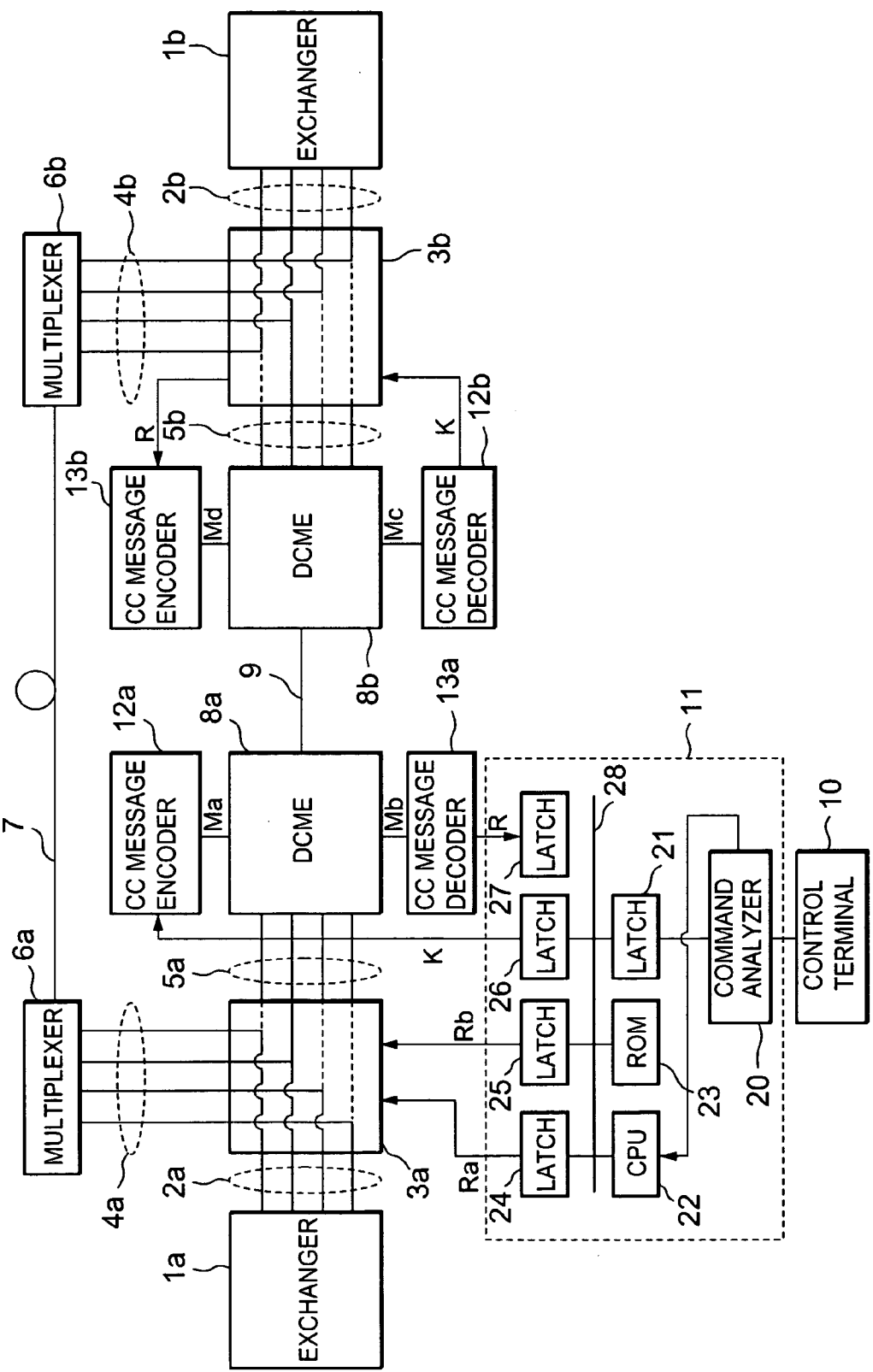
FIG. 1 is a block diagram showing the constitution of a communication system according to an embodiment of the present invention.

With reference to FIG. 1 showing a block diagram showing the constitution of a communication system embodying the present invention, a telephone line between two exchange stations is duplicated of a working cable line and a protection radio line for countermeasures against natural calamities, and the like, a digital circuit multiplication equipment (DCME) defined by ITU-T G. 763 is disposed on the side of the protection radio line, and a line switch circuit for switching the cable line and radio line is added between the exchange station and the DCME.

In FIG. 1, four lines 2a connected to a first exchanger (exchange station) 1a transmit 2048 kbit/s signals defined by ITU-T G. 732. These lines 2a are connected to a first line switch circuit 3a. The line switch circuit 3a connects the lines 2a to both lines 4a and 5a, or either lines 4a or 5a in accordance with a cable line connection request signal Ra and a radio line connection request signal Rb outputted from a line controller 11 described later. Additionally, the line switch circuit 3a performs such line switch for each line.

Four lines 4a are connected to a first multiplexer 6a. The multiplexer 6a multiplexes the 2048 kbit/s signals transmitted by the lines 4a and defined by the ITU-T G. 732 to provide a 8192 kbit/s signal. Moreover, the multiplexer 6a transmits the multiplexed signal to a cable line 7. Moreover, upon receiving the multiplexed 8192 kbit/s signal from the cable line 7, the multiplexer 6a demultiplexes this signal into four 2048 kbit/s signals, and outputs these signals to the four lines 4a.

The cable line 7 is connected to a second multiplexer 6b. The multiplexer 6b disposed opposite to the multiplexer 6a demultiplexes the multiplexed 8192 kbit/s signal transmitted by the cable line 7 into four 2048 kbit/s signals, and outputs these signals to four lines 4b. Moreover, the multiplexer 6b multiplexes the 2048 kbit/s signals inputted from the lines 4b to provide a 8192 kbit/s signal, and transmits the multiplexed signal to the cable line 7.

On the other hand, four lines 5a are connected to first DCME 8a provided with a function defined by the ITU-T G. 763. The DCME 8a multiplexes the 2048 kbit/s signals transmitted by the lines 5a and defined by the ITU-T G. 732 to provide the 2048 kbit/s signal defined by the ITU-T G. 763 by an adaptive differential pulse code modulation (AD-PCM) technique and a digital speech interpolation (DSI) technique. Moreover, the DCME 8a transmits the multiplexed signal (DCME frame) to a radio line (satellite line) 9.

Moreover, upon receiving the multiplexed 2048 kbit/s signal (DCME frame) from the radio line 9, the DCME 8a demultiplexes this signal into four 2048 kbit/s signals according to the technique defined by the ITU-T G. 763, and outputs these signals to four lines 5a.

The radio line 9 is connected to second DCME 8b provided with the function defined by the ITU-T G. 763. The DCME 8b disposed opposite to the DCME 8a demultiplexes the multiplexed 2048 kbit/s signal transmitted by the radio line 9 into four 2048 kbit/s signals by the technique defined by the ITU-T G. 763, and outputs these signals to four lines 5b. Moreover, the DCME 8b multiplexes the 2048 kbit/s signals inputted from the lines 5b to provide the 2048 kbit/s signal defined by the ITU-T G. 763 by the ADPCM and DSI techniques, and transmits the multiplexed signal to the radio line 9.

The lines 4b and 5b are connected to a second line switch circuit 3b. The line switch circuit 3b connects either the lines 4b or 5b to lines 2b in accordance with a line switch signal K outputted from a CC message decoder 12b described later. Additionally, the line switch circuit 3b performs such line switch for each line. The four lines 2b transmit the 2048 kbit/s signals defined by the ITU-T G. 732, and are connected to a second exchanger (exchange station) 1b.

Moreover, the line controller 11 controls the line switch circuit 3a of the local station side, and additionally controls the line switch circuit 3b of the remote station side via a CC message encoder 12a, local station side DCME 8a, radio line 9, remote station side DCME 8b and CC message decoder 12b.

A control terminal 10 issues, to the line controller 11, a command for switch to the radio line 9 or a command for switch to the cable line 7. A command analyzer 20 in the line controller 11 analyzes the command issued from the control terminal 10, and outputs an analysis result to a latch circuit 21. The latch circuit 21 holds the analysis result of the command analyzer 20. A CPU 22 controls the entire line controller. A read-only memory (ROM) 23 stores a program for the CPU 22 to execute a processing described later. A latch circuit 24 holds a connection signal, outputted from the CPU 22, for connecting the line 2a to the line 4a (cable line 7). A latch circuit 25 holds a connection signal, outputted from the CPU 22, for connecting the line 2a to the line 5a (radio line 9). A latch circuit 26 holds a line switch signal, outputted from the CPU 22, for requesting the line switch to the remote station side line switch circuit 3b. The latch circuit 21, CPU 22, ROM 23, latch circuits 24, 25, 26, 27 are connected to one another via a bus 28. Moreover, the command analyzer 20 outputs an interruption signal INT to the CPU 22 to notify the issuance of the command from the control terminal 10.

Furthermore, the line switch signal K outputted by the latch circuit 26 is inputted to the CC message encoder 12a which performs the operation defined by the ITU-T G. 763. The CC message encoder 12a collects DSI control signal to be transmitted to the remote station, ADPCM control signal, alarm information, and other messages, performs encoding defined by the ITU-T G. 763, and generates a control channel message (hereinafter referred to as CC message) Ma. Furthermore, the CC message encoder 12a as first setting means in the present invention allots the unused bit of the CC message Ma to the line switch signal K outputted from the line controller 11. The CC message Ma generated by the CC message encoder 12a is outputted to the DCME 8a.

The DCME 8a inserts the CC message Ma into a predetermined position in the 2048 kbit/s DCME frame defined by the ITU-T G. 763 during the above-described multiplex processing. The DCME frame generated by the DCME 8a is transmitted to the radio line 9. The DCME 8b having received the DCME frame via the radio line 9 extracts a CC message Mc from the received DCME frame, and outputs the message to the CC message decoder 12b. Moreover, the DCME 8b decodes the phone signal and data signal included in the received DCME frame as defined in the ITU-T G. 763, and transmits an output to the lines 5b.

The CC message decoder 12b as first extracting means in the present invention extracts the line switch signal K included in the CC message Mc, and outputs the signal to the line switch circuit 3b. In response to the line switch signal K, the line switch circuit 3b connects either the line 4b or 5b to the line 2b.

Moreover, the line switch circuit 3b outputs a line switch end signal R indicating the current local selection state, that is, the local station side utilized line to a CC message encoder 13b. The CC message encoder 13b as second setting means in the present invention performs encoding defined by the ITU-T G. 763, generates a CC message Md, and allots the unused bit of the CC message Md to the line switch end signal R. The CC message Md generated by the CC message encoder 13b is outputted to the DCME 8b.

The DCME 8b inserts the CC message Md into the predetermined position in the 2048 kbit/s DCME frame defined in the ITU-T G. 763 during the above-described multiplex processing. The DCME frame generated by the DCME 8b is transmitted to the radio line 9. The DCME 8a having received the DCME frame via the radio line 9 extracts a CC message Mb from the received DCME frame, and outputs the message to the CC message decoder 13a. Moreover, the DCME 8a decodes the phone signal and data signal included in the received DCME frame as defined by the ITU-T G. 763, and transmits an output to the lines 5b.

The CC message decoder 13a extracts the line switch end signal R included in the CC message Mb, and outputs the signal to the line controller 11. The latch circuit 27 in the line controller 11 holds this line switch end signal R. The CPU 22 reads the signal held by the latch signal 27 to recognize the remote station side utilized line.

Figure 2:
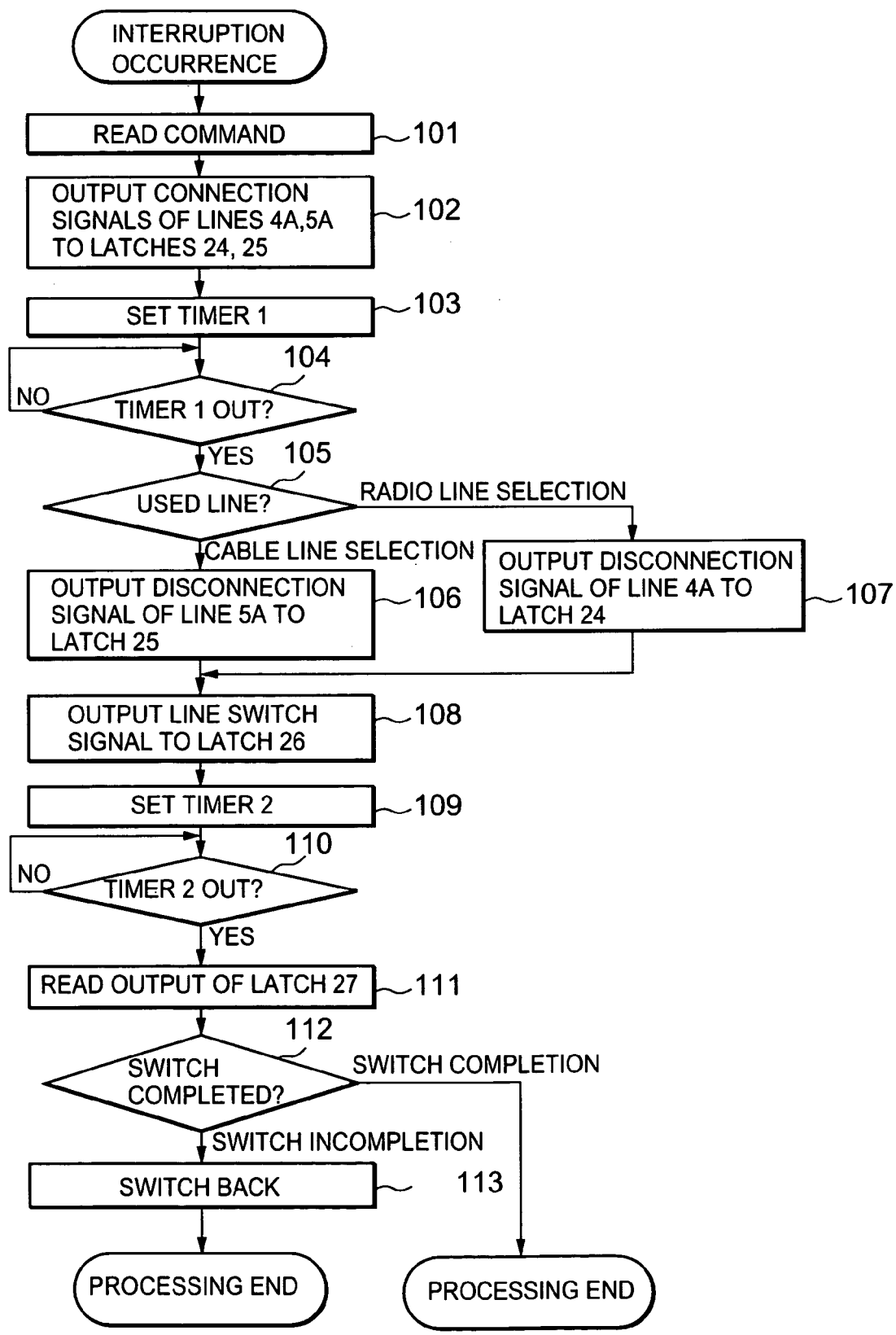
FIG. 2 is a flowchart showing the operation of a line controller.

The operation of the communication system will next be described with reference to FIG. 2 showing a flowchart of the operation of the line controller 11. In the present embodiment, it is assumed that the command for switch to the radio line 9 or the command for switch to the cable line 7 is issued from the control terminal 10.

The command analyzer 20 in the line controller 11 analyzes the command issued from the control terminal 10, and outputs the analysis result to the latch circuit 21. The latch circuit 21 holds the analysis result of the command analyzer 20. Upon receiving the command from the control terminal 10, the command analyzer 20 outputs the interruption signal INT for notifying the issuance of the command from the control terminal 10 to the CPU 22. When the CPU 22 recognizes by the generation of the interruption signal INT that the command is issued from the control terminal 10, the program shown in FIG. 2 starts. After the program starts, the CPU 22 reads the line switch command held by the latch circuit 21 (step 101).

Subsequently, the CPU 22 outputs the connection signal to the latch circuit 24 to connect the line 2a to the line 4a (cable line 7), and additionally outputs the connection signal to the latch circuit 25 to connect the line 2a to the line 5a (radio line 9) (step 102). The latch circuits 24, 25 hold the connection signals outputted from the CPU 22. The output of the latch circuit 24 is outputted as the cable line connection request signal Ra to the line switch circuit 3a, and the output of the latch circuit 25 is outputted as the radio line connection request signal Rb to the line switch circuit 3a. Thereby, the line switch circuit 3a connects the line 2a to both the lines 4a, 5a.

Subsequently, the CPU 22 sets, on a timer 1, a time necessary for the DCME apparatus 8a to DIS-process the signals inputted from the lines 5a (step 103), and starts time measurement by the timer 1. Subsequently, the CPU 22 judges whether the time set on the timer 1 has elapsed or not (step 104). When the time set on the timer 1 elapses (YES in the step 104), the CPU 22 deciphers the line switch command read in the step 101 (step 105). By the processing of the steps 102 to 104, the line 2a is connected to both the line 4a (cable line 7) and line 5a (radio line 9) for a definite time. Reasons for this will be described hereinafter.

Since the DCME 8a defined by the ITU-T G. 763 uses the DSI processing technique, a certain definite time is necessary from the moment the connection of the line 2a is switched to the protection line 5a from the working line 4a until all the signals of the lines 2a are subjected to the DSI processing in the DCME 8a and transmitted to the remote station DCME 8b. Therefore, during such line switch, signal disconnection is caused by the DSI processing. Consequently, in the present invention, to minimize the influence of the signal disconnection, both the lines 4a, 5a are connected to the lines 2a and the signals of the lines 2a are subjected beforehand to the DSI processing in the DCME 8a for the definite time immediately before the local station side line switch circuit 3a is controlled to perform the line switch. This can shorten the signal disconnection time attributed to the DSI processing time of the DCME 8a.

Subsequently, in step 105, the CPU 22 deciphers the line switch command read in the step 101, and sets the radio line 9 (line 5a) or the cable line 7 (line 4a) as the connection of the line 2a. Specifically, the CPU 22 selects the radio line 9 as the connection of the line 2a when the line switch command held in the latch circuit 21 is the command for the switch to the radio line 9, and selects the cable line 7 as the connection of the line 2a when it is the command for the switch to the cable line 7.

When selecting the cable line 7 as the connection of the lines 2a, the CPU 22 outputs a disconnection signal to the latch circuit 25 to disconnect the lines 5a connected to the DCME 8a from the lines 2a (step 106). Thereby, since no radio line connection request signal Rb is outputted from the latch circuit 25, the line switch circuit 3a disconnects the lines 2a from the lines 5a. Additionally, since the cable line connection request signal Ra is outputted, the line switch circuit 3a maintains the connected state of the lines 2a and 4a.

Moreover, when selecting the radio line 9 as the connection of the lines 2a, the CPU 22 outputs a disconnection signal to the latch circuit 24 to disconnect the lines 4a from the lines 2a (step 107). Thereby, since no cable line connection request signal Ra is outputted from the latch circuit 24, the line switch circuit 3a disconnects the lines 2a from the lines 4a. Additionally, since the radio line connection request signal Rb is outputted, the line switch circuit 3a maintains the connected state of the lines 2a and 5a.

As described above, the line switch circuit 3a performs the line switch for each line. In the present embodiment, there are four lines for each of the lines 2a, 4a and 5a, there are also line switch commands from the control terminal 10 for the four lines. Subsequently, the CPU 22 performs the above-described line selection for each line in accordance with the line switch command from the control terminal 10, and outputs the connection signals and disconnection signals for the four lines.

In accordance with the outputs of the CPU 22 for the four lines, there are also cable line connection request signals Ra and radio line connection request signals Rb from the latch circuits 24 and 25 for the four lines, and the line switch circuit 3a performs the line switch for each line in response to the signals Ra and Rb for the four lines. Therefore, for example, the line switch can be performed so that one of the lines 2a is connected to one of the lines 4a, and the remaining three of the lines 2a are connected to three of the lines 5a.

After the local station side line switch is completed, the CPU 22 outputs the line switch signal to the latch circuit 26 to match the remote station side utilized line with the local station side utilized line (step 108). The output of the latch circuit 26 is outputted as the line switch signal K to the CC message encoder 12a. The CC message encoder 12a allots the unused bit of the CC message Ma inserted into the DCME frame for the remote station to the line switch signal K.

Figure 3:
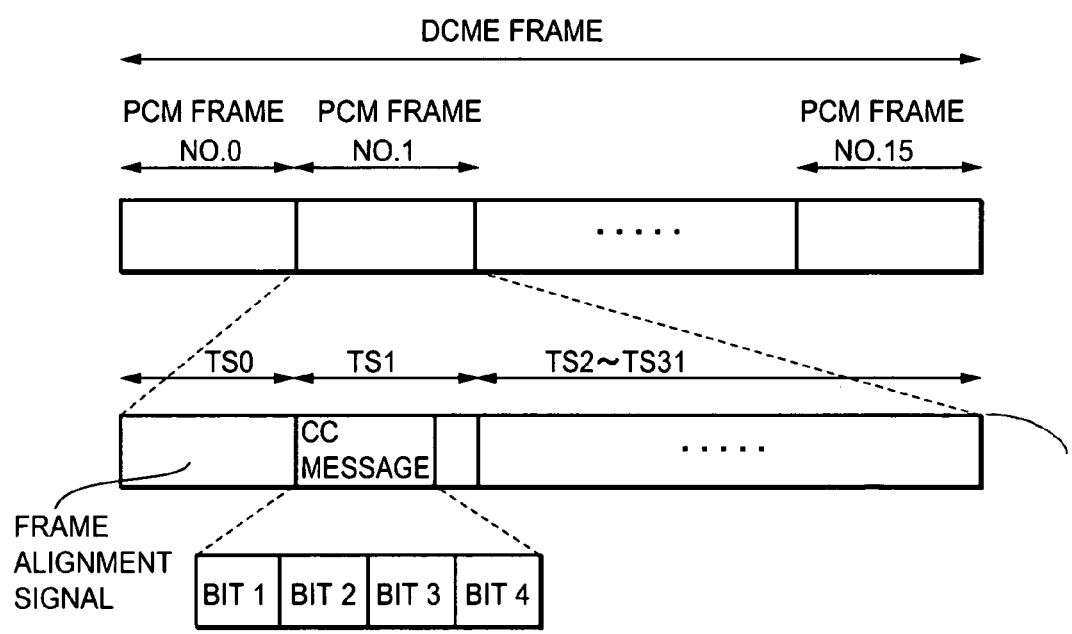
FIG. 3 is a diagram showing the structure of a DCME frame.
Figure 4:
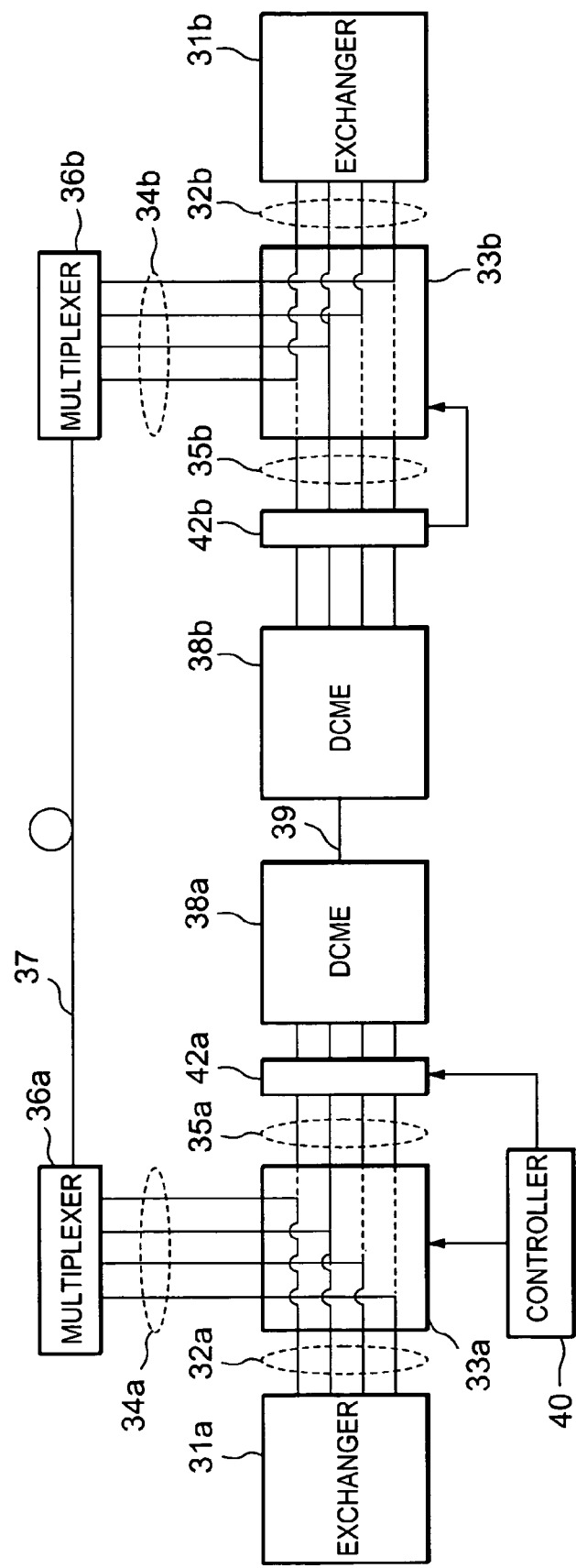
FIG. 4 is a block diagram showing the constitution of a conventional communication system.

Here, the structure of the DCME frame and CC message defined by the ITU-T G. 763 will be described with reference to FIG. 3 showing the structure of the DCME frame. Moreover, the following table 1 shows asynchronous data words defined in G. 763 in the structure of the CC message. In FIG. 3, TS0 to TS31 denote time slots. Moreover, in FIG. 3, PCM frames 0 to 15 are constituted by the time slots TS0 to TS31, respectively.

[Table 1]

TABLE 1

| DCME frame No. | Content of CC message | | | | |
|---|---|---|---|---|---|
| | CC message | | | | |
| | Bit 1 | Bit 2 | Bit 3 | Bit 4 | Content of CC message |
| 0 | | | | | Alarm indication signal defined by ITU-T G.763 |
| . | . | . | . | . | |
| . | . | . | . | . | |
| . | . | . | . | . | |
| 60 | | | | | |
| 61 | . . . | R1 | R2 | R3 | R1: line switch end signal (1) |
| | | | | | R2: line switch end signal (2) |
| | | | | | R3: line switch end signal (3) |
| 62 | . . . | R4 | . . . | . . . | R4: line switch end signal (4) |
| 63 | K1 | K2 | K3 | K4 | K1: line switch signal (1) |
| | | | | | K2: line switch signal (2) |
| | | | | | K3: line switch signal (3) |
| | | | | | K4: line switch signal (4) |

In the 2048 kbit/s DCME frame defined by the ITU-T G. 763, as shown in FIG. 3, the CC message is inserted into the bits 1 to 4 of the time slot TS1 included in each of PCM frames 0 to 15. Furthermore, in the remaining bits of the time slot TS1 and the time slots TS2 to TS31 included in each PCM frame, the phone signal or the data signal inputted to the DCME apparatus is subjected to the DSI processing and ADPCM processing, multiplexed and inserted. As shown in Table 1, the CC message encoder 12a allots the bits 1 to 4 of the CC message inserted into DCME frame 63 to the line switch signals K (K1 to K4). The CC message Ma generated by the CC message encoder 12a is outputted to the DCME 8a.

The DCME 8a inserts the CC message Ma into the predetermined position in the DCME frame during the multiplex processing. In this manner, the line switch signals K (K1 to K4) are inserted into the CC message in the DCME frame 63 transmitted to the radio line 9 from the DCME 8a. The DCME 8b having received the DCME frame via the radio line 9 extracts the CC message Mc from the received DCME frame, and outputs this message to the CC message decoder 12b. The CC message decoder 12b extracts the line switch signal K (K1 to K4) included in the CC message Mc, and outputs this signal to the line switch circuit 3b. The line switch circuit 3b connects either line 4b or 5b to the line 2b in accordance with the line switch signal K.

As described above, the line switch circuit 3b performs the line switch for each line. In the present embodiment, since there are four lines for each of the lines 2b, 4b, 5b, also for the line switch signal K, there are K1 to K4 for four lines as shown in Table 1. For the line switch signals K1 to K4, for example, value "0" indicates the request for the switch to the line 4b (cable line 7), and "1" indicates the request for the switch to the line 5b (radio line 9). The line switch circuit 3b performs the line switch for each line in accordance with the line switch signals K for these four lines. Moreover, the line switch circuit 3b outputs the line switch end signal R indicating the local station side utilized line to the CC message encoder 13b.

As shown in Table 1, the CC message encoder 13b allots the bits 2 to 4 of the CC message inserted into the DCME frame 61 and the bit 2 of the CC message inserted into the DCME frame 62 to the line switch end signals R (R1 to R4). The CC message Md generated by the CC message encoder 13b is outputted to the DCME 8b. For the line switch end signal R, as shown in Table 1, there are R1 to R4 for four lines. For the line switch end signals R1 to R4, for example, value "0" indicates that the corresponding line in the lines 2b is connected to the line 4b (cable line 7) (i.e., the utilized line is the cable line 7), and "1" indicates that the corresponding line in the lines 2b is connected to the line 5b (radio line 9) (i.e., the utilized line is the radio line 9).

The DCME 8b inserts the CC message Md into the predetermined position in the DCME frame during the multiplex processing. In this manner, the line switch end signals R (R1 to R4) are inserted into the CC messages in the DCME frames 61, 62 transmitted to the radio line 9 from the DCME 8b. The DCME 8a having received the DCME frame via the radio line 9 extracts the CC message Mb from the received DCME frame, and outputs this message to the CC message decoder 13a. The CC message decoder 13a extracts the line switch end signal R (R1 to R4) included in the CC message Mb, and outputs the signal to the line controller 11. The latch circuit 27 in the line controller 11 holds this line switch end signal R.

Subsequently, the CPU 22 sets, on timer 2, the time from when the processing of the step 108 is performed until the switch of the remote station utilized line is completed (step 109), and starts time measurement by the timer 2. Subsequently, the CPU 22 judges whether the time set on the timer 2 has elapsed or not (step 110). When the time set on the timer 2 elapses (YES in the step 110), the CPU 22 reads the line switch end signals R (R1 to R4) held in the latch circuit 27 (step 111). Subsequently, the CPU 22 recognizes the remote station side utilized line based on the line switch end signals R (R1 to R4) (step 112). When the local station utilized line agrees with the remote station utilized line in the step 112, the CPU 22 judges that the switch of the remote station utilized line is completed, and ends the processing shown in FIG. 2.

Moreover, when the local station utilized line disagrees with the remote station utilized line in the step 112, the CPU 22 judges that the line switch to the remote station is rejected for some reason, and outputs the connection signal or disconnection signal to the latch circuits 24, 25 to return the utilized line before performing the line switch in response to the line switch command from the control terminal 10. Thereby, the line switch circuit 3a returns to the state before the switch (Step 113).

According to the present invention, by disposing the DCME defined by the ITU-T G. 763 on the radio line side, disposing the setting means for allotting the control channel unused bit in the DCME frame transmitted from the local station side DCME to the line switch signal for requesting the line switch to the remote station side line switch circuit, and further disposing the extracting means for extracting the line switch signal from the control channel unused bit in the DCME frame received from the remote station side DCME and outputting the signal to the remote station side line switch circuit, it is unnecessary to transmit the line switch signal using the channel for transmitting the data signal or the phone signal, so that the line can be switched by sending the line switch signal to the remote station side from the local station side without deteriorating the transmission efficiency.

Moreover, by disposing the control means for outputting the line switch signal to the setting means after the local station side line switch ends, after the local station side line switch is performed, the other station side line switch is performed, and it is unnecessary to exchange the protocol between the local station and remote station (inquiry as to whether the line switch is possible or not, response from the remote station to this inquiry, line switch request, response from the remote station indicating whether the line switch in response to the line switch request ends or not), so that the time from when the line switch is requested until the line switch ends can be shortened.

Moreover, since the control means connects both the cable line and the radio line via the DCME apparatus to the local station side exchange station for the definite time immediately before the local station side line switch circuit is controlled to perform the line switch, the signal disconnection time attributed to the DSI processing time of the DCME can be shortened.

What is claimed is:

1. A system transmitting a signal from one system to another system by utilizing plural lines comprising:
   communicating means for communicating the signal;
   first transmitting means for transmitting a first signal through a first line;
      inserting means for inserting a line switch signal which requests to switch a utilized line of another system into a second signal;
      second transmitting means for transmitting the second signal through a second line, and transmitting the line switch signal to another system after the utilized line was switched;
      switching means for switching the utilized line, and transmitting the signal between the communicating means and the first transmitting means, or between the communicating means and the second transmitting means;
      extracting means for extracting a line switch end signal which indicates the utilized line of another system from the second signal transmitted from another system side to the second transmitting means; and
      controlling means for controlling the switching means to return to the state before switching when the utilized lines of the system disagrees with the utilized line of another system, and controlling the switching means to keep the present state when the utilized line of the system agrees with the utilized line of another system.

2. The system as claimed in claim 1 wherein:
   the second transmitting means is digital circuit multiplication equipment defined by ITU-T G.763.

3. The system as claimed in claim 1, wherein:
   the inserting means inserts the line switch signal into the control channel bit of the second signal.

4. The system as claimed in claim 1, wherein:
   the switching means switches to transmit to another system by both the first transmitting means and the second transmitting means for a predetermined time before the second transmitting means transmits the line switch signal.

5. A system transmitting a signal from one system to another system by utilizing plural lines comprising:
   a communicator that communicates the signal;
      a first transmitter that transmits a first signal through a first line;
      an inserting circuit which inserts a line switch signal which requests to switch a utilized line of another system into a second signal;
      a second transmitter that transmits the second signal through a second line, and transmits the line switch signal to another system after the utilized line was switched;
      a switch that switches the utilized line, and transmits the signal between the communicator and the first transmitter, and the signal between the communicator and the second transmitter;
      an extracting circuit that extracts a line switch end signal which indicates the utilized line of another system from the second signal transmitted from another system side to the second transmitter; and
      a controller that controls the switch to return to the state before switching when the utilized line of the system disagrees with the utilized line of another system, or controls the switch to keep the present state when the utilized line of the system agrees with the utilized line of another system.

6. The system as claimed in claim 5, wherein:
   the second transmitter is digital circuit multiplication equipment defined by ITU-T G.763.

7. The system as claimed in claim 5, wherein:
   the inserting circuit inserts the line switch signal into the control channel bit of the second signal.

8. The system as claimed in claim 5, wherein:
   the switch switches to transmit to another system by both the first transmitter and the second transmitter for a predetermined time before the second transmitter transmits the line switch signal.

9. A transmitting method between one system and another system by utilizing at least one of a first signal through a first line and a second signal through a second line, comprising steps of:
   inserting a line switch signal which requests to switch a utilized line of another system into the second signal;
   switching a utilized line;
   transmitting the line switch signal to another system after having switched the utilized line;
   extracting a line switch end signal which indicates the utilized line of another system from a second signal transmitted from another system side; and
   controlling to return to the state before switching when the utilized lines of the system disagrees with the utilized line of another system, or controlling the switching means to keep the present state when the utilized lines of the system agrees with the utilized line of another system.

10. The transmitting method as claimed in claim 9, wherein:

the second signal is a signal defined by ITU-T G.763.

11. The transmitting method as claimed in claim 9, wherein:

the inserting step is inserting the line switch signal into the control channel bit of the second signal.

12. The transmitting method as claimed in claim 9, wherein:

the switching step is switching to transmit to another system by both the first line and the second line for a predetermined time before the tier system transmits the line switch signal.

* * * * *